United States Patent
Ohno (10) Patent No.: US 6,362,924 B2
(45) Date of Patent: Mar. 26, 2002

(54) REAL-IMAGE-TYPE ZOOM FINDER

(75) Inventor: Kazunori Ohno, Omiya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/776,916

(22) Filed: Feb. 6, 2001

(30) Foreign Application Priority Data

Mar. 22, 2000 (JP) ........................................ 2000-079675

(51) Int. Cl.$^7$ ................................................. G02B 15/14
(52) U.S. Cl. ...................................................... 359/689
(58) Field of Search ........................ 359/689, 643–647

(56) References Cited

U.S. PATENT DOCUMENTS 4,094,587 A    6/1978   Besenmatter et al.
5,191,477 A *  3/1993   Abe et al. .................... 359/695

FOREIGN PATENT DOCUMENTS

JP    4-19705    1/1992
JP    11-109446  4/1999

* cited by examiner

*Primary Examiner*—Scott J. Sugarman
(74) *Attorney, Agent, or Firm*—Arnold International; Bruce Y. Arnold (57) ABSTRACT

A compact, real-image-type zoom finder having a high zoom ratio and high optical performance is provided. The finder is formed of an objective optical system and an erecting eyepiece. The objective optical system is formed of, in order from the object side, a first lens element having negative refractive power with a concave surface on the object side, a second lens element having positive refractive power, and a third lens element that is a positive meniscus lens with its convex surface on the object side. The erecting eyepiece is formed of an erecting prism having refractive surfaces integrally formed on the input end and output end of the erecting prism. The magnification of the finder is changed by moving the second lens element along the optical axis, and the third lens element is moved along the optical axis in order to adjust for what would otherwise be a shifting in image surface position with the change in magnification. Specified conditions are satisfied in order to provide a compact structure and high image quality.

11 Claims, 6 Drawing Sheets

EMBODIMENT 1

Spherical
Aberration (diop.)
Fig. 4A

Curvature
of Field (diop.)
Fig. 4B

Distortion (%)
Fig. 4C

Spherical
Aberration (diop.)
Fig. 4D

Curvature
of Field (diop.)
Fig. 4E

Distortion (%)
Fig. 4F

Spherical
Aberration (diop.)
Fig. 4G

Curvature
of Field (diop.)
Fig. 4H

Distortion (%)
Fig. 4I

Spherical
Aberration (diop.)
Fig. 5A

Curvature
of Field (diop.)
Fig. 5B

Distortion (%)
Fig. 5C

Spherical
Aberration (diop.)
Fig. 5D

Curvature
of Field (diop.)
Fig. 5E

Distortion (%)
Fig. 5F

Spherical
Aberration (diop.)
Fig. 5G

Curvature
of Field (diop.)
Fig. 5H

Distortion (%)
Fig. 5I

Spherical
Aberration (diop.)
Fig. 6A

Curvature
of Field (diop.)
Fig. 6B

Distortion (%)
Fig. 6C

Spherical
Aberration (diop.)
Fig. 6D

Curvature
of Field (diop.)
Fig. 6E

Distortion (%)
Fig. 6F

Spherical
Aberration (diop.)
Fig. 6G

Curvature
of Field (diop.)
Fig. 6H

Distortion (%)
Fig. 6I

REAL-IMAGE-TYPE ZOOM FINDER

BACKGROUND OF THE INVENTION

Recently the development of finders suitable for cameras has flourished according to market demand for miniaturization of cameras. Real-image-type finders have become most prevalent due to their being compact. Moreover, the development of high magnification zoom finders suitable for use with high magnification cameras has increased.

Compact real-image-type finders with a small number of lens elements have generally been formed using an objective lens system and an eye lens system with an intermediate erecting system in which a condenser lens is bonded with adhesive to two triangular prisms that are joined to form a Porro prism. Recently, with the progress of plastic molding techniques, the cost of making real-image-type finders having an extremely small number of lens elements has been considerably reduced. These finders generally include an erecting eyepiece system and an objective lens system. The erecting eyepiece system may be formed using a condenser lens, a Porro prism, and an eye lens that are each made of plastic and molded as an integral unit. Such finders have been disclosed in Japanese Laid Open Patent Applications H4-19705 and H11-109446. These finders are practicable because the objective optical system is relatively small and may be easily assembled when the lens has a fixed focus or zooms with a zoom ratio of about 2.

However, using the above-mentioned, conventional design results in large-size finders when the objective lens system is required to have a higher zoom ratio. Thus, such a design cannot simultaneously satisfy the market demand for miniaturization and higher zoom ratios. Even though the objective lens system may have a fixed focus or a low magnification in these well-known examples, the erecting eyepiece system has a relatively long focal length. This allows sufficient space along the optical path for placement of the four reflecting surfaces needed in the erecting eyepiece system in order to invert and erect the image. However, the erecting eyepiece system prevents such a design from being compact. Further, for a wide-angle image field, the image size increases. Thus, the finder becomes large-sized.

In order to achieve a high magnification with a real-image-type zoom finder that is compact, the objective lens system must achieve a high zoom ratio. This causes the minium number of lens elements in the objective lens system to increase in order to maintain high image quality, and also causes the overall length of the objective lens system to increase. In the above-discussed, conventional lens systems, the objective lens becomes large-sized due to its required high magnification.

Shortening the focal length range of the objective lens system is also a method for seeking both high magnification and compactness in a real-image-type zoom finder. However, this approach results in the image size formed by the objective lens system decreasing and the zoom ratio decreasing, or the optical path length of the erecting system must be decreased. Thus, either the finder must have less zoom capability or the optical path length of the erecting system must be shorter. Even if the focal length of the eye lens system can be decreased in order to maintain a high zoom ratio, such a reduction in focal length of the eye lens system is undesirable as it requires the erecting optical system to be divided into two parts, one part before and one part after the imaging position of the objective lens system.

Thus, there is market demand for a high magnification, real-image-type zoom finder that is compact, uses a small number of lens elements, is inexpensive, easy to assemble, and provides a satisfactory image to a viewer using the finder.

BRIEF SUMMARY OF THE INVENTION

This invention relates to a real-image-type zoom finder suitable for conventional film cameras or electronic cameras, and particularly to a real-image-type zoom finder having a high zoom ratio. The object of the present invention is to miniaturize the objective optical system as well as to miniaturize the erecting eyepiece lens system of a finder in order to obtain a zoom finder that has a high zoom ratio and is compact. More particularly, the object of the invention, is to provide a real-image-type finder having a zoom ratio of about four that provides high quality imaging, is compact, and is formed of a small number of lens elements.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The real-image-type zoom finder of this invention is formed of an objective lens system and an eyepiece optical system. The invention will now be described in general terms with reference to FIG. 1 of the drawings.

Figure 1:
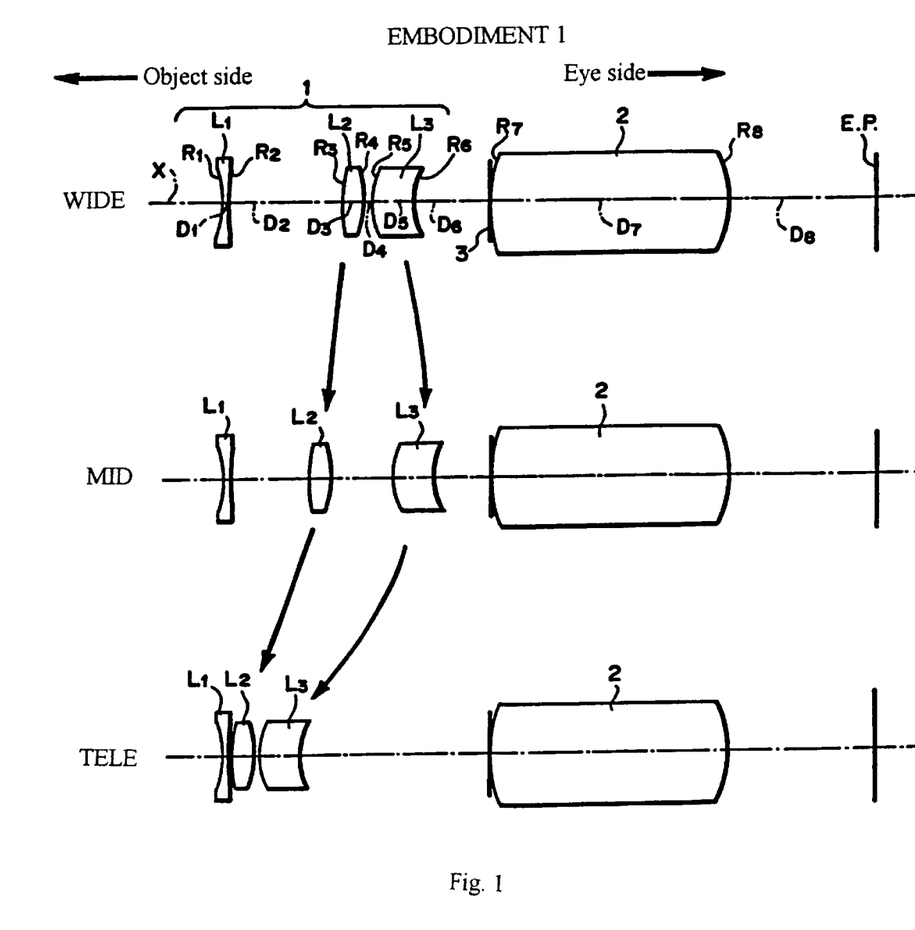
FIG. 1 shows the lens element configuration and positions of a real-image-type zoom finder according to Embodiment 1 of the invention at the wide-angle end (WIDE), a mid-position (MID), and at the telephoto end (TELE)

As illustrated in FIG. 1 for three zoom positions (WIDE, MID, and TELE), the real-image-type zoom finder of the invention is formed of, in order from the object side, an objective system 1 and an erecting eyepiece system 2.

The objective system 1 includes, in order from the object side, a first lens element $L_1$ of negative refractive power having a concave surface on the object side, a second lens element $L_2$ of positive refractive power, and a third lens element $L_3$ formed of a positive meniscus lens having its convex surface on the object side. The magnification of the finder is changed by moving the second lens element $L_2$ along the optical axis X as indicated by the arrows. The third lens element $L_3$ is moved along the optical axis, as indicated, in order to prevent what would otherwise be a shifting of the image surface with the change of magnification. A collimated beam of light that is incident the finder parallel to the optical axis X is imaged to eye point position E.P.

The eyepiece optical system 2 includes an erecting prism, with the surfaces that form the eyepiece optical system being integrally formed on the end surfaces of the erecting prism. Thus, the surface of radius $R_7$ is shaped to serve as a condenser lens, and the erecting prism has four reflection surfaces (not illustrated) so that an input image is both inverted and reverted. The exit surface of radius $R_8$ of the prism is shaped to have positive refractive power and serves as an eyepiece lens. The erecting prism may include a short-range correction mark (not illustrated) that is engraved on the surface $R_7$ nearest the object side for adjusting for parallax.

The finder is compact and, due to the small number of lens elements used, inexpensive to manufacture and assemble. In addition, it has high optical performance and a high-magnification objective lens system, while saving space.

The following Conditions (1) and (2) are satisfied:

$0.3 < f_2/f_t < 0.6$   Condition (1)

$1.0 < f_4/D_8 < 1.3$   Condition (2)

where
$f_2$ is the focal length of the second lens element,
$f_t$ is the focal length of the objective optical system at the telephoto end,
$f_4$ is the focal length of the erecting eyepiece, and
$D_8$ is the distance from the surface of the erecting prism nearest the eye side to the eye position.

It is preferable that the real-image-type zoom finder of this invention also satisfies the following Conditions (3)–(5):

$0.5 < R_6/f_w < 1.0$   Condition (3)

$0.3 < D_5/f_w < 0.7$   Condition (4)

$0.3 < R_7/f_t < 1.3$   Condition (5)

where
$R_6$ is the radius of curvature of the third lens element on the eye side,
$f_w$ is the focal length of the objective optical system at the wide-angle end,
$D_5$ is the on-axis thickness of the third lens element,
$R_7$ is the radius of curvature of the erecting eyepiece system nearest the object side, and
$f_t$ is the focal length of the objective optical system at the telephoto end.

Further, it is preferred that the erecting eyepiece system is molded as one piece using plastic, and that a short-range parallax correction mark is engraved on the erecting prism surface nearest the object side. It is also preferred that the first lens element, the second lens element, and the third lens element of the objective optical system and the erecting eyepiece system are each formed of molded plastic and that at least one surface, of among these first, second and third lens elements of the objective optical system and the lens surfaces of the erecting eyepiece system, has a non-spherical surface.

Condition (1) balances aberration generation versus the amount of movement of the second lens element $L_2$ during zooming. If the value of the ratio $f_2/f_t$ in Condition (1) is less than the lower limit, the refractive power of the second lens element $L_2$ becomes too strong, and increased spherical aberration makes it difficult to maintain high imaging performance over the entire range of zoom. On the other hand, if the upper limit of Condition (1) is not satisfied, the amount of movement of the second lens element $L_2$ during zooming becomes excessive and the entire objective lens system becomes too large for the finder to be compact.

Condition (2) is to ensure that the erecting eyepiece system 2 is properly designed. The erecting eyepiece system 2 enables costs to be reduced by employing a prism having four, total internal reflection surfaces as compared to having to employ a less effective optical coating to make one or more of the four surfaces reflective. Therefore, it is desired that a light beam in the erecting eyepiece system 2 be roughly telecentric. In this case, the refractive power of the surface of the prism where the light beam exits, which serves as an eye lens of the erecting eyepiece system 2, should be nearly equal to the reciprocal of the distance between this exit surface and the intended eye position E. P. of an observer (i.e., the pupil distance $D_8$). Because the erecting eyepiece system 2 is so arranged that the focal position of the objective lens system 1 is very near the incident surface of the erecting eyepiece system 2, the curvature of the incident surface makes almost no contribution to the focal distance of the erecting eyepiece system 2. Accordingly, the focal length of the erecting eyepiece system 2 must be nearly equal to the pupil distance $D_8$. Moreover, in the case of compact cameras, the pupil distance should be in the range from 10 mm to 20 mm. Thus, erecting eyepiece system 2 needs to have positive refractive power in order to collect incident light to serve as an eyelens. If the focal length of the erecting eyepiece system 2 is too long, the pupil distance becomes too long. Therefore the focal length $f_4$ of the erecting eyepiece is specified by Condition (2).

If the ratio $f_4/D_8$ of Condition (2) is less than the lower limit, the optical path length for arranging the four internal reflection surfaces of the erecting eyepiece system 2 will be insufficient. On the other hand, if the upper limit of Condition (2) is exceeded, the optical path length will becomes too long, resulting in the finder system no longer being compact.

Moreover, by satisfying Conditions (3) and (4), the objective lens system can be made compact. In a high magnification system, by making the first lens element $L_1$ have a negative refractive power, smaller diameter lens elements can be used. Conversely, however, the back focus of the objective lens system is increased. Accordingly, it is desirable that the third lens element $L_3$ be formed of a positive meniscus lens.

The third lens element $L_3$ plays a role of improving the field curvature over the entire zoom range by being a positive meniscus lens with its convex surface on the object side. Moreover, aberrations generated by the object-side, concave surface of the first lens element $L_1$ can be cancelled and aberrations of the entire system can be well maintained over the entire zoom range by making the surface of this third lens element $L_3$ on the eye side have a relatively strong refractive power by being in the range specified by Condition (3). Furthermore, by being a positive meniscus shape, this third lens element $L_3$ enables the refractive power of the convex surface on the object side to be stronger, which thereby reduces the back focus. If the ratio of $R_6/f_w$ is less than the lower limit of Condition (3), the refractive power of the surface on the eye side becomes too strong, and aberrations such as spherical aberration increase. Thus, it also becomes difficult to maintain favorable correction of aberrations without using one or more non-spherical surfaces. If the ratio of $R_6/f_w$ is more than this upper limit, the refractive power of the convex surface on the object side of the third lens element $L_3$ becomes too weak, thus causing the back focus to increase.

Condition (4) is to allow the back focus to be further decreased. If the value of the ratio $D_5/f_w$ is less than the lower limit, the refractive power of the convex surface on the object side of the third lens element $L_3$ weakens with respect to the refractive power of the concave surface on the eye side of the third lens element $L_3$, and thus the back focus is difficult to reduce. On the other hand, if the upper limit is exceeded, the diameter of the third lens element $L_3$ becomes excessive. The third lens element enables the back focus of the objective optical system, as well as its overall length, to be shortened, while maintaining sufficient curvature of field over the entire range of zoom.

Condition (5) specifies the relation between the refractive power of the erecting eyepiece system 2 on the light incidence side and the objective lens system 1. As described above, the light incidence surface of the erecting eyepiece system 2 serves as a condenser lens. Moreover, it is desired that light beams in the erecting eyepiece system 2 be roughly telecentric, and for the principal ray to be roughly parallel to the optical axis.

If the positive refractive power of the light incident surface of the erecting eyepiece system 2 is strong, the refractive angle of an off-axial beam bent at this plane increases. Therefore, the angle made by the principal ray of an off-axis beam of a light that is incident to the erecting eyepiece system 2 is increased in order to satisfy a condition that the light beam in the erecting eyepiece system 2 be roughly telecentric. In this case, the size of the first lens element $L_1$ having negative refractive power increases and the deterioration of aberrations in the objective lens system 1 (i.e., in the light before the erecting eyepiece system 2) is promoted.

Conversely, if the incident surface of the erecting eyepiece system 2 has a weak positive refractive power or a weak negative refractive power, the principal ray of an off-axis beam of a light that is incident to the erecting eyepiece system 2 makes a smaller angle with the optical axis in order to satisfy such a condition that the light beams in the erecting eyepiece system 2 be roughly telecentric. In this case, the outer diameter of the second lens element $L_2$ or the third lens element $L_3$ increases. This causes a deterioration of aberrations in the objective lens system 1 in front of the erecting eyepiece system 2.

Condition (5) balances the size and properties of the objective lens system 1 versus the light beam being nearly telecentric in the erecting eyepiece system 2. If the value of the ratio of $R_7/f_t$ is less than the lower limit, the refractive power on the light incidence side of the erecting eyepiece system 2 becomes too strong and the inclination angles relative to the optical axis of light rays within the erecting eyepiece system 2 become too large. Thus, allowing the first lens element to have too large a diameter causes a problem. If the upper limit of Condition (5) is exceeded, an increase of the outer diameters of the second lens element $L_2$ and the third lens element $L_3$ becomes a problem.

Moreover, in the erecting eyepiece system 2 of this real-image-type zoom finder, the incident surface serves as a condenser lens, the exit surface serves as an eye lens of positive refractive power, and the entire erecting eyepiece system can be molded as one piece of plastic, with a short-range, parallax correction mark engraved on the surface nearest the object side. This reduces the cost, and increases the accuracy. When the erecting eyepiece system 2 is molded as one piece of plastic, coma and curvature of field aberrations are apt to increase. To suppress these aberrations, the surface on the eye side may be made non-spherical.

The first to the third lens elements $L_1$–$L_3$ can also each be formed of molded plastic, in order to reduce cost. A non-spherical surface may be formed on at least one surface among the first to the third lens elements $L_1$–$L_3$ and the erecting eyepiece system 2. In this way, a real-image-type, high magnification zoom finder having high optical performance and a low price can be provided.

Specific embodiments of the invention will now be set forth in detail.

Embodiment 1

As shown in FIG. 1, in this embodiment a diaphragm 3 is arranged in the vicinity of the incident surface of the erecting eyepiece system 2.

Table 1 below lists the surface number #, in order from the object side, the radius of curvature R (in mm) of each surface near the optical axis, the on-axis spacing D (in mm) between surfaces, as well as the index of refraction Nd and the Abbe value $\upsilon_d$ (at the d line) of each lens element of Embodiment 1. Those surfaces listed with a * to the right of the surface number are aspherical. The shape of these non-spherical surfaces is given by the following Equation (A):

$$Z = C h^2/(1+(1-KC^2h^2)^{1/2}) + A_4 h^4 + A_6 h^6 + A_8 h^8 + A_{10} h^{10} \quad \text{Equation A}$$

where

Z is the length (in mm) of a line drawn from a point on the aspherical surface at distance h from the optical axis to the tangential plane of the aspherical surface vertex, $C\, (=1/R)$ is the curvature of the aspherical surface near the optical axis, h is the distance (in mm) from the optical axis, K is the eccentricity, and $A_4, A_6, A_8$, and $A_{10}$ are the 4th, 6th, 8th, and 10th aspherical coefficients.

TABLE 1

| # | R | D | $N_d$ | $\upsilon_d$ |
|---|---|---|---|---|
| 1* | −10.0780 | 0.8000 | 1.58364 | 57.6 |
| 2 | 43.9042 | $D_2$ (variable) | | |
| 3 | 15.5381 | 2.5000 | 1.49023 | 57.6 |
| 4* | −8.2847 | $D_4$ (variable) | | |
| 5* | 7.5501 | 4.5608 | 1.49023 | 57.6 |
| 6 | 6.4093 | $D_6$ (variable) | | |
| 7 | 12.8000 | 26.8 | 1.49023 | 57.6 |
| 8* | −8.9850 | 16.0 | | |
| 9 | pupil position (E.P.) | | | |

Table 2 lists the values of the magnification, as well as the lens element spacings $D_2, D_4, D_6$ as well as the image angle $2\omega$ and the focal distance for each of the wide-angle end (WIDE), the mid-position (MID) and the telephoto end (TELE) for this embodiment.

TABLE 2

| | Magnification | $D_2$ | $D_4$ | $D_6$ | $2\omega$ | Focal Distance |
|---|---|---|---|---|---|---|
| WIDE | 0.413 | 12.4992 | 1.0128 | 8.5638 | 49.8° | 7.40 (i.e., $f_w$) |
| MID | 0.802 | 4.4936 | 10.0444 | 7.5378 | 24.0° | 14.37 |
| TELE | 1.487 | 0.2436 | 0.6956 | 21.1132 | 12.8° | 26.64 (i.e., $f_t$) |

The values of each of the constants C, K and $A_4$–$A_{10}$ of the aspherical surfaces indicated in Table 1 above are given in Table 3.

TABLE 3

| # | C | K | $A_4$ | $A_6$ | $A_8$ | $A_{10}$ |
|---|---|---|---|---|---|---|
| 1 | −0.0927644 | 0.921145 | $1.4534 \times 10^{-4}$ | $-1.5922 \times 10^{-7}$ | $-2.8949 \times 10^{-11}$ | $-3.5616 \times 10^{-15}$ |
| 4 | −0.1207044 | 0.887288 | $3.2601 \times 10^{-4}$ | $8.2009 \times 10^{-6}$ | $-3.0989 \times 10^{-7}$ | $3.0648 \times 10^{-9}$ |
| 5 | 0.1324486 | 0.737123 | $7.4672 \times 10^{-6}$ | $-5.3242 \times 10^{-7}$ | $-7.9391 \times 10^{-11}$ | $-9.3020 \times 10^{-15}$ |
| 8 | −0.1112966 | −0.537412 | $-1.3307 \times 10^{-4}$ | $1.5166 \times 10^{-6}$ | $1.1678 \times 10^{-8}$ | $-1.3903 \times 10^{-9}$ |

Figure 4A:
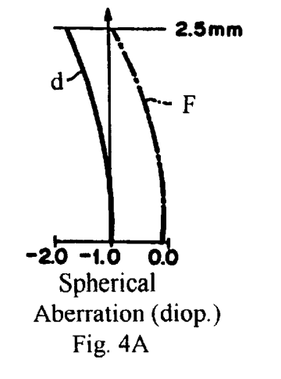
FIGS. 4A–4C show the spherical aberration (in diopters), curvature of field (in diopters), and distortion, respectively, of Embodiment 1 at the wide-angle end.
Figure 4B:
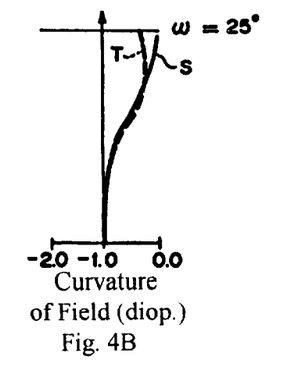
Figure 4C:
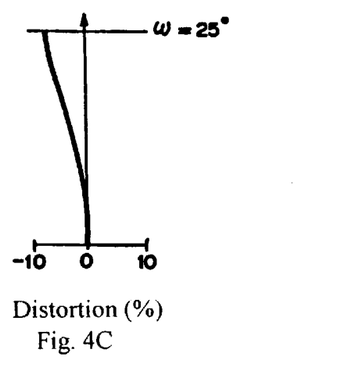
Figure 4D:
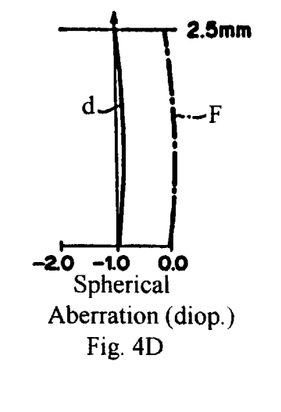
FIGS. 4D–4F show the spherical aberration (in diopters), curvature of field (in diopters), and distortion, respectively, of Embodiment 1 at the mid-position.
Figure 4E:
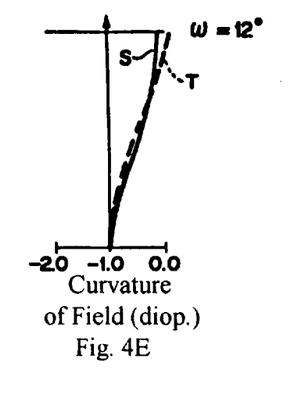
Figure 4F:
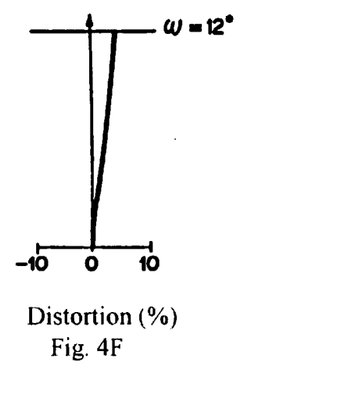
Figure 4G:
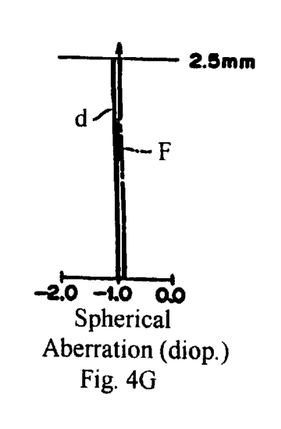
FIGS. 4G–4I show the spherical aberration (in diopters), curvature of field (in diopters), and distortion, respectively, of Embodiment 1 at the telephoto end.
Figure 4H:
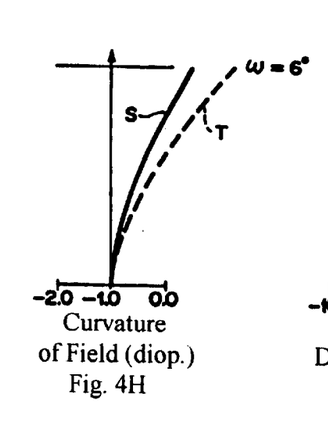
Figure 4I:
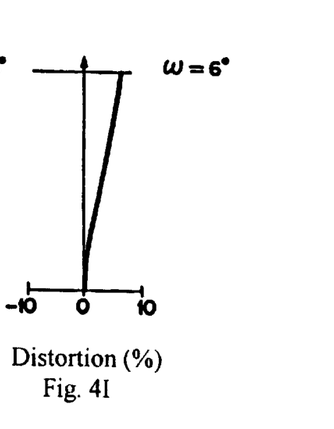

FIGS. 4A–4C show the spherical aberration (in diopters), curvature of field (in diopters), and distortion, respectively, of Embodiment 1 at the wide-angle end. FIGS. 4D–4F show the spherical aberration (in diopters), curvature of field (in diopters), and distortion, respectively, of Embodiment 1 at the mid-position, and FIGS. 4G–4I show the spherical aberration (in diopters), curvature of field (in diopters), and distortion, respectively, of Embodiment 1 at the telephoto end. In each figure of spherical aberration, curves are given for both the d and F lines, and in each figure of curvature of field, curves are given for both the sagittal S and tangential T image surfaces.

Embodiment 2

Figure 2:
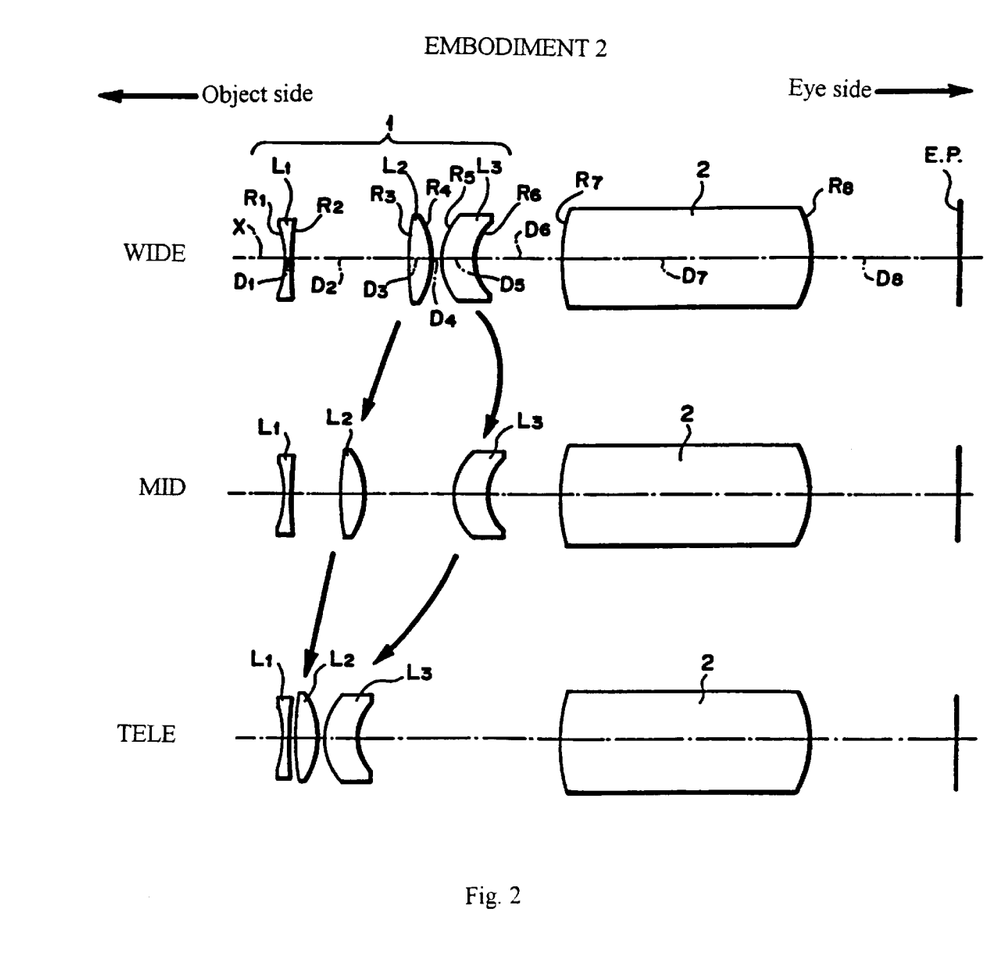
FIG. 2 shows the lens element configuration and positions of a real-image-type zoom finder according to Embodiment 2 of the invention at the wide-angle end (WIDE), a mid-position (MID), and at the telephoto end (TELE)

As shown in FIG. 2, this embodiment is very similar in lens element configuration to that of Embodiment 1. In this embodiment, the diaphragm is omitted, the radii of curvature differ, and those surfaces that are aspherical are different.

Table 4 below lists the surface number #, in order from the object side, the radius of curvature R (in mm) of each surface near the optical axis, the on-axis spacing D (in mm) between surfaces, as well as the index of refraction $N_d$ and the Abbe value $\upsilon_d$ (at the d line) of each lens element of Embodiment 2. Those surfaces listed with a * to the right of the surface number are aspherical. The shape of these non-spherical surfaces is given by Equation (A) above.

TABLE 4

| # | R | D | $N_d$ | $\upsilon_d$ |
|---|---|---|---|---|
| 1* | −9.6366 | 0.8500 | 1.58364 | 57.6 |
| 2 | 79.9044 | $D_2$ (variable) | | |
| 3* | 22.8102 | 2.5500 | 1.49023 | 57.6 |
| 4 | −8.0840 | $D_4$ (variable) | | |
| 5* | 6.0636 | 3.8569 | 1.49023 | 57.6 |
| 6 | 5.0458 | $D_6$ (variable) | | |
| 7 | 22.0150 | 28.2625 | 1.49023 | 57.6 |
| 8* | −9.4383 | 17.0 | | |
| 9 | pupil position (E.P.) | | | |

Table 5 lists the values of the magnification, as well as the lens element spacings $D_2, D_4, D_6$ as well as the image angle $2\omega$ and the focal distance for each of the wide-angle end (WIDE), the mid-position (MID) and the telephoto end (TELE) for this embodiment.

TABLE 5

| | Magnification | $D_2$ | $D_4$ | $D_6$ | $2\omega$ | Focal Distance |
|---|---|---|---|---|---|---|
| WIDE | 0.413 | 13.6633 | 1.0759 | 9.97050 | 49.7° | 7.84 (i.e., $f_w$) |
| MID | 0.885 | 4.3465 | 10.2612 | 10.1020 | 21.7° | 16.61 |
| TELE | 1.359 | 1.1056 | 2.9243 | 20.6798 | 14.0° | 25.76 (i.e., $f_t$) |

The values of each of the constants C, K and $A_4$–$A_{10}$ of the aspherical surfaces indicated in Table 4 above are given in Table 6.

TABLE 6

| # | C | K | $A_4$ | $A_6$ | $A_8$ | $A_{10}$ |
|---|---|---|---|---|---|---|
| 1 | −0.1037710 | 1.642426 | $2.5052 \times 10^{-4}$ | $-1.6542 \times 10^{-7}$ | $-3.8860 \times 10^{-11}$ | $-4.3582 \times 10^{-14}$ |
| 3 | 0.0438400 | −1.313504 | $-3.3236 \times 10^{-4}$ | $8.8114 \times 10^{-8}$ | $-6.2886 \times 10^{-11}$ | $-5.1066 \times 10^{-15}$ |
| 5 | 0.1649185 | 0.957009 | $-1.5251 \times 10^{-4}$ | $-3.6057 \times 10^{-7}$ | $-1.0453 \times 10^{-10}$ | $-1.5191 \times 10^{-14}$ |
| 8 | −0.1059513 | −0.521860 | $-7.5011 \times 10^{-5}$ | $-7.0924 \times 10^{-7}$ | $7.8646 \times 10^{-9}$ | $-6.5998 \times 10^{-10}$ |

Figure 5A:
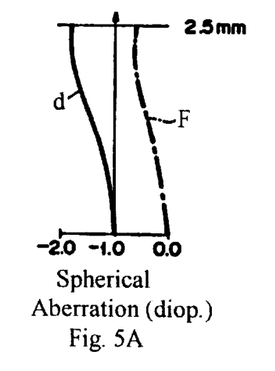
FIGS. 5A–5C show the spherical aberration (in diopters), curvature of field (in diopters), and distortion, respectively, of Embodiment 2 at the wide-angle end.
Figure 5B:
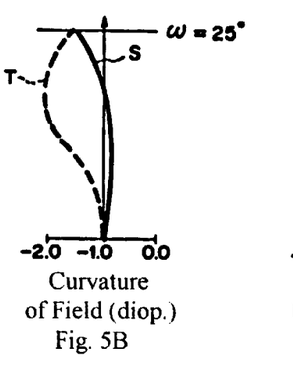
Figure 5C:
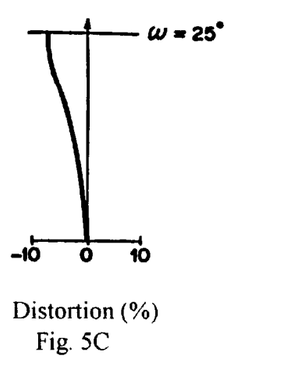
Figure 5D:
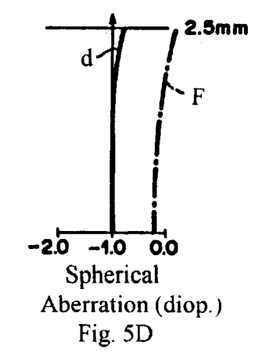
FIGS. 5D–5F show the spherical aberration (in diopters), curvature of field (in diopters), and distortion, respectively, of Embodiment 2 at the mid-position.
Figure 5E:
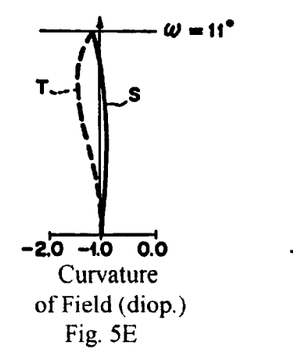
Figure 5F:
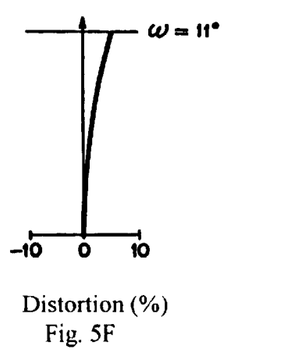
Figure 5G:
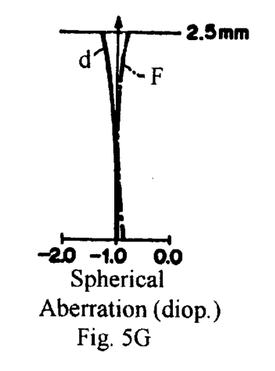
FIGS. 5G–5I show the spherical aberration (in diopters), curvature of field (in diopters), and distortion, respectively, of Embodiment 2 at the telephoto end.
Figure 5H:
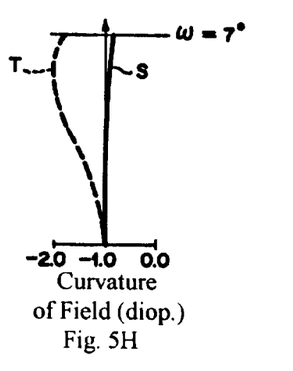
Figure 5I:
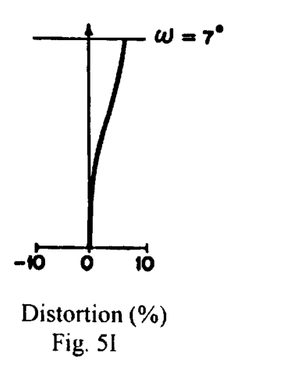

FIGS. 5A–5C show the spherical aberration (in diopters), curvature of field (in diopters), and distortion, respectively, of Embodiment 2 at the wide-angle end, FIGS. 5D–5F show the spherical aberration (in diopters), curvature of field (in diopters), and distortion, respectively, of Embodiment 2 at the mid-position, and FIGS. 5G–5I show the spherical aberration (in diopters), curvature of field (in diopters), and distortion, respectively, of Embodiment 2 at the telephoto end. In each figure of spherical aberration, curves are given for both the d and F lines, and in each figure of curvature of field, curves are given for both the sagittal S and tangential T image surfaces.

Embodiment 3

Figure 3:
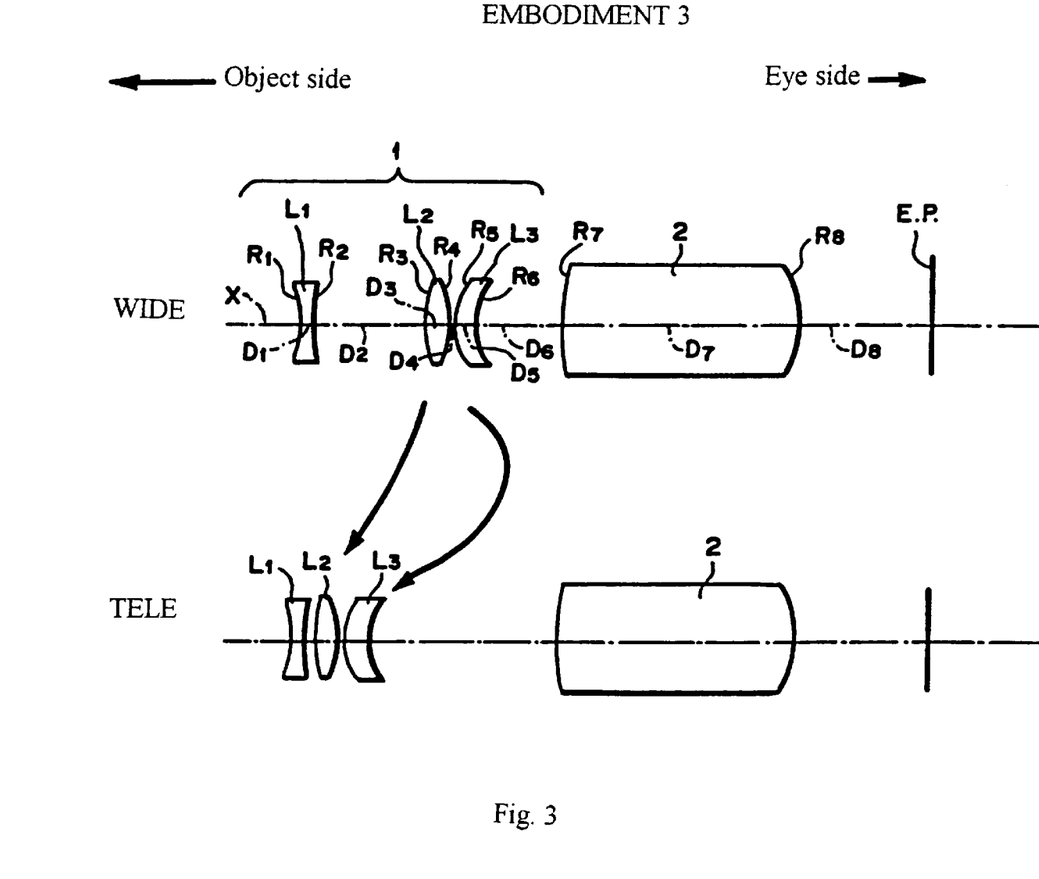
FIG. 3 shows the lens element configuration and positions of a real-image-type zoom finder according to Embodiment 3 of the invention at the wide-angle end (WIDE) and at the telephoto end (TELE)

As shown in FIG. 3, this embodiment is very similar in lens element configuration to that of Embodiment 1. In this embodiment, the diaphragm is omitted, the radii of curvature differ, and those surfaces that are aspherical are different.

Table 7 lists the surface number #, in order from the object side, the radius of curvature R (in mm) of each surface near the optical axis, the on-axis spacing D (in mm) between surfaces, as well as the index of refraction $N_d$ and the Abbe value $\upsilon_d$ (at the d line) of each lens element of Embodiment 3. Those surfaces listed with a * to the right of the surface number are aspherical. The shape of these non-spherical surfaces is given by Equation (A) above.

TABLE 7

| # | R | D | $N_d$ | $\upsilon_d$ |
|---|---|---|---|---|
| 1 | −9.8883 | 0.7500 | 1.58364 | 57.6 |
| 2* | 32.5607 | $D_2$ (variable) | | |

TABLE 7-continued

| # | R | D | $N_d$ | $\upsilon_d$ |
|---|---|---|---|---|
| 3 | 13.5074 | 2.3438 | 1.49023 | 57.6 |
| 4* | −7.8656 | $D_4$ (variable) | | |
| 5* | 5.4561 | 2.8121 | 1.49023 | 57.6 |
| 6 | 4.6588 | $D_6$ (variable) | | |
| 7 | 28.1250 | 24.8438 | 1.49023 | 57.6 |
| 8* | −8.2804 | 15.0 | | |
| 9 | pupil position (E.P.) | | | |

Table 8 lists the values of the magnification, as well as the lens element spacings $D_2$, $D_4$, $D_6$ as well as the image angle $2\omega$ and the focal distance for each of the wide-angle end (WIDE), the mid-position (MID) and the telephoto end (TELE) for this embodiment.

TABLE 8

| | Magnification | $D_2$ | $D_4$ | $D_6$ | $2\omega$ | Focal Distance |
|---|---|---|---|---|---|---|
| WIDE | 0.414 | 12.2714 | 0.9495 | 9.0414 | 50.5° | 6.84 (i.e., $f_w$) |
| MID | 0.804 | 4.5453 | 11.2402 | 6.4768 | 25.1° | 13.28 |
| TELE | 1.489 | 0.5096 | 0.6521 | 21.1003 | 12.6° | 24.62 (i.e., $f_t$) |

The values of each of the constants C, K and $A_4$–$A_{10}$ of the aspherical surfaces indicated in Table 7 above are given in Table 9.

TABLE 9

| # | C | K | $A_4$ | $A_6$ | $A_8$ | $A_{10}$ |
|---|---|---|---|---|---|---|
| 2 | 0.0307119 | 39.32528 | $2.2085 \times 10^{-4}$ | $-3.3266 \times 10^{-6}$ | $-2.0138 \times 10^{-6}$ | $1.0268 \times 10^{-7}$ |
| 4 | −0.1271359 | 0.419540 | $2.2526 \times 10^{-4}$ | $-9.5613 \times 10^{-6}$ | $1.7429 \times 10^{-6}$ | $-5.5168 \times 10^{-8}$ |
| 5 | 0.1832811 | 0.538600 | $3.5151 \times 10^{-4}$ | $-2.7913 \times 10^{-6}$ | $2.3182 \times 10^{-7}$ | $5.5973 \times 10^{-9}$ |
| 8 | −0.1207592 | −0.562595 | $-5.6471 \times 10^{-5}$ | $-1.5538 \times 10^{-6}$ | $1.8914 \times 10^{-8}$ | $-2.0358 \times 10^{-9}$ |

Figure 6A:
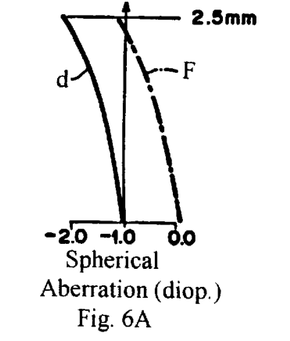
FIGS. 6A–6C show the spherical aberration (in diopters), curvature of field (in diopters), and distortion, respectively, of Embodiment 3 at the wide-angle end.
Figure 6B:
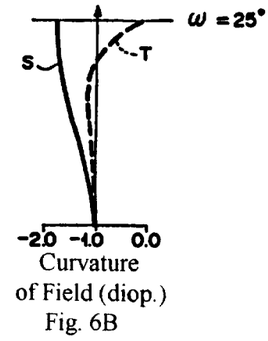
Figure 6C:
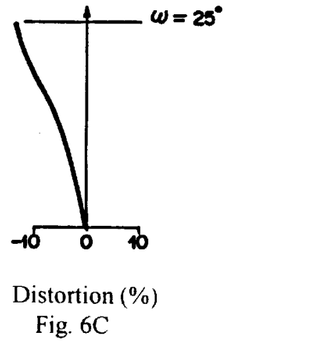
Figure 6D:
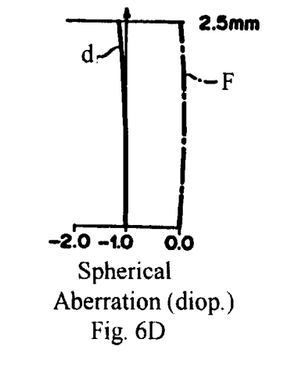
FIGS. 6D–6F show the spherical aberration (in diopters), curvature of field (in diopters), and distortion, respectively, of Embodiment 3 at the mid-position.
Figure 6E:
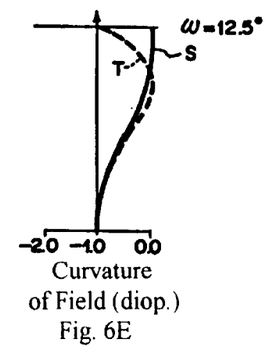
Figure 6F:
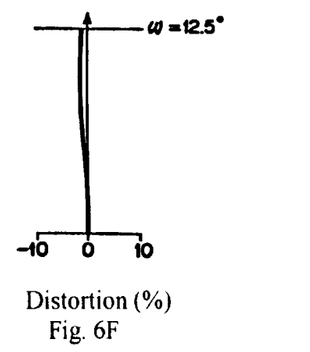
Figure 6G:
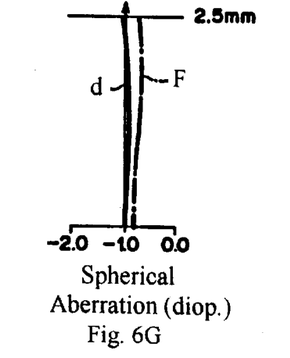
FIGS. 6G–6I show the spherical aberration (in diopters), curvature of field (in diopters), and distortion, respectively, of Embodiment 3 at the telephoto end.
Figure 6H:
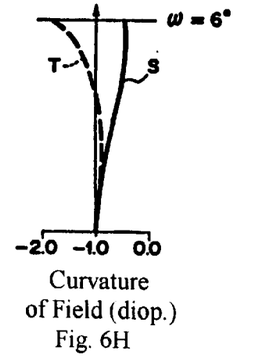
Figure 6I:
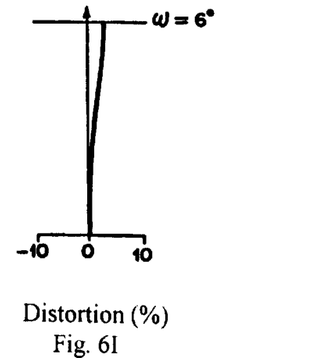

FIGS. 6A–6C show the spherical aberration (in diopters), curvature of field (in diopters), and distortion, respectively, of Embodiment 3 at the wide-angle end. FIGS. 6D–6F show the spherical aberration (in diopters), curvature of field (in diopters), and distortion, respectively, of Embodiment 3 at the mid-position. And, FIGS. 6G–6I show the spherical aberration (in diopters), curvature of field (in diopters), and distortion, respectively, of Embodiment 3 at the telephoto end. In each figure of spherical aberration, curves are given for both the d and F lines, and in each figure of curvature of field, curves are given for both the sagittal S and tangential T image surfaces.

The values corresponding to the Conditions (1)–(5) in Embodiments 1–3 are shown in Table 10. As is apparent from comparing these values with the given condition, each of Embodiments 1–3 satisfies Conditions (1)–(5).

TABLE 10

| Embodiment #: | 1 | 2 | 3 |
|---|---|---|---|
| Condition (1) value ($f_2/f_t$): | 0.429 | 0.486 | 0.427 |
| Condition (2) value ($f_4/D_8$): | 1.131 | 1.125 | 1.122 |
| Condition (3) value ($R_6/f_w$): | 0.866 | 0.644 | 0.681 |
| Condition (4) value ($D_5/f_w$): | 0.616 | 0.492 | 0.411 |
| Condition (5) value ($R_7/f_t$): | 0.480 | 0.855 | 1.142 |

As described above, the real-image-type zoom finder of this invention provides a high magnification ratio in a compact finder that uses a small number of lens elements and yet provides high image quality.

The invention being thus described, it will be obvious that the same may be varied in many ways. For example, the surface of the third lens element $L_3$ on the eye side and the light incident surface of the erecting eyepiece system 2 are spherical surfaces as described in Embodiments 1–3, above. However, aspherical surfaces may instead be used for these surfaces. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A real-image-type zoom finder formed of an objective optical system and an erecting eyepiece, as follows:

the objective optical system consisting of, in order from the object side, a first lens element having negative refractive power with a concave surface on the object side, a second lens element having positive refractive power, and a third lens element that is a positive meniscus lens with its convex surface on the object side;

the erecting eyepiece formed of an erecting prism having refractive surfaces integrally formed on the input end and output end of the erecting prism;

wherein the magnification of the finder is changed by moving the second lens element along the optical axis, and the third lens element is moved along the optical axis in order to adjust for what would otherwise be a shifting of image surface position with the change in magnification, and the following conditions are satisfied:

$0.3 < f_2/f_t < 0.6$ $1.0 < f_4/D_8 < 1.3$ where $f_2$ is the focal length of the second lens element, $f_t$ is the focal length of the objective optical system at the telephoto end, $f_4$ is the focal length of the erecting eyepiece, and $D_8$ is the distance from surface of the erecting prism nearest the eye side to the eye position.

2. The real-image-type zoom finder of claim 1, wherein the following conditions are satisfied:

$0.5 < R_6/f_w < 1.0$ $0.3 < D_5/f_w < 0.7$ where $R_6$ is the radius of curvature of the third lens element on the eye side, $f_w$ is the focal length of the objective optical system at the wide-angle end, and $D_5$ is the on-axis thickness of the third lens element.

3. The real-image-type zoom finder of claim 1, wherein the following condition is satisfied:

$0.3 < R_7/f_t < 1.3$ where $R_7$ is the radius of curvature of the erecting eyepiece system nearest the object side, and $f_t$ is the focal length of the objective optical system at the telephoto end.

4. The real-image-type zoom finder of claim 2, wherein the following condition is satisfied:

$0.3 < R_7/f_t < 1.3$ where $R_7$ is the radius of curvature of the erecting eyepiece system nearest the object side, and $f_t$ is the focal length of the objective optical system at the telephoto end.

5. The real-image-type zoom finder of claim 1, wherein the erecting eyepiece is formed of molded plastic and a parallax short-range correction mark is engraved on the erecting prism surface nearest the object side.

6. The real-image-type zoom finder of claim 2, wherein the erecting eyepiece is formed of molded plastic and a parallax short-range correction mark is engraved on the erecting prism surface nearest the object side.

7. The real-image-type zoom finder of claim 3, wherein the erecting eyepiece is formed of molded plastic and a parallax short-range correction mark is engraved on the erecting prism surface nearest the object side.

8. The real-image-type zoom finder of claim 1, wherein the first lens element, the second lens element, the third lens element, and the erecting eyepiece are each formed of molded plastic and, among these lens elements, a non-spherical surface is formed on at least one surface thereof.

9. The real-image-type zoom finder of claim 2, wherein the first lens element, the second lens element, the third lens element and the erecting eyepiece are each formed of molded plastic and, among these lens elements, a non-spherical surface is formed on at least one surface thereof.

10. The real-image-type zoom finder of claim 3, wherein the first lens element, the second lens element, the third lens element, and the erecting eyepiece are each formed of molded plastic and, among these lens elements, a non-spherical surface is formed on at least one surface thereof.

11. The real-image-type zoom finder of claim 4, wherein the first lens element, the second lens element, the third lens element, and the erecting eyepiece are each formed of molded plastic and, among these lens elements, a non-spherical surface is formed on at least one surface thereof.

* * * * *

UNITED STATES PATENT AND TRADEMARK OFFICE
CERTIFICATE OF CORRECTION

PATENT NO. : 6,362,924 B2
DATED : March 26, 2002
INVENTOR(S) : Ohno

It is certified that error appears in the above-identified patent and that said Letters Patent is hereby corrected as shown below:

Column 1,
Line 5, change "Recently the" to -- Recently, the --; and

Column 2,
Line 2, change "eve" to -- eye --.

Signed and Sealed this

Fourth Day of June, 2002

Attest:

Attesting Officer

JAMES E. ROGAN
Director of the United States Patent and Trademark Office